United States Patent
Vuorikari et al.

(10) Patent No.: US 7,115,687 B2
(45) Date of Patent: Oct. 3, 2006

(54) PROCESS AND APPARATUS FOR PRODUCING OLEFIN POLYMERS

(75) Inventors: Marianna Vuorikari, Hamari (FI); Esa Korhonen, Porvoo (FI); Henrik Andtsjö, Porvoo (FI); Samuli Zitting, Tuusula (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/532,607

(22) PCT Filed: Oct. 27, 2003

(86) PCT No.: PCT/FI03/00799

§ 371 (c)(1),
(2), (4) Date: Apr. 25, 2005

(87) PCT Pub. No.: WO2004/039847

PCT Pub. Date: May 13, 2004

(65) Prior Publication Data

US 2006/0052552 A1 Mar. 9, 2006

(30) Foreign Application Priority Data

Oct. 30, 2002 (EP) .................................. 02396161

(51) Int. Cl.
*C08F 2/34* (2006.01)
(52) U.S. Cl. ............................. 526/64; 526/65; 525/52; 525/53
(58) Field of Classification Search .................. 526/64, 526/65; 525/52, 53
See application file for complete search history.

(56) References Cited

U.S. PATENT DOCUMENTS

| 3,816,383 | A | | 6/1974 | Stotko |
| 4,187,278 | A | | 2/1980 | Clifford |
| 4,395,523 | A | | 7/1983 | Kirch |
| 4,420,592 | A | | 12/1983 | Kato et al. |
| 4,740,550 | A | * | 4/1988 | Foster .......................... 525/52 |
| 5,326,835 | A | | 7/1994 | Ahvenainen et al. |
| 5,684,097 | A | | 11/1997 | Palmroos et al. |
| 6,455,643 | B1 | * | 9/2002 | Harlin et al. .................. 526/65 |
| 6,586,537 | B1 | * | 7/2003 | Marissal et al. .............. 526/70 |

FOREIGN PATENT DOCUMENTS

| EP | 0 801 081 A2 | 10/1997 |
| EP | 1 083 183 A9 | 3/2001 |
| EP | 1 275 661 A1 | 1/2003 |
| WO | WO-98/58977 A1 | 12/1998 |
| WO | WO-00/42077 A1 | 7/2000 |

* cited by examiner

*Primary Examiner*—Fred Teskin
(74) *Attorney, Agent, or Firm*—Birch, Stewart, Kolasch & Birch, LLP

(57) ABSTRACT

The present invention concerns a process and an apparatus for continuous polymerisation of olefin monomers in a cascade of polymerisation reactors. According to the process, an olefin monomer is polymerised first in slurry phase in an inert hydrocarbon diluent in at least one loop reactor and then, subsequently, in gas phase in at least one gas phase reactor. According to the invention, a polymer slurry is continuously withdrawn from the loop reactor and optionally concentrated. The concentrated slurry is conducted to a high pressure flash unit in order to remove the remaining fluid phase, and fed to the gas phase reactor. With the process described in this invention, it is possible to produce bimodal polyethylene with good properties. The operation of the process is stable because of the truly continuous operation.

20 Claims, 1 Drawing Sheet

PROCESS AND APPARATUS FOR PRODUCING OLEFIN POLYMERS

BACKGROUND OF THE INVENTION

1. Field of the Invention

The present invention relates to olefin polymerisation. In particular, the present invention concerns a process and an apparatus for continuous polymerisation olefin monomers like ethylene and other monomers in a cascade of polymerisation reactors, wherein an olefin monomer is polymerised first in slurry phase in an inert hydrocarbon diluent in at least one loop reactor and then, subsequently, in gas phase in at least one gas phase reactor.

2. Description of Related Art

The loop reactor was developed in the 1950's. It is now widely used for the production of polyethylene and other olefin polymers. In a loop reactor, ethylene is polymerised in the presence of a hydrocarbon diluent in slurry phase at elevated pressure and temperature. The slurry is withdrawn from the reactor and concentrated so that the solids content at the reactor outlet is higher than the solids content in the reactor. Traditionally, this has been done by using settling legs. However, present methods for concentrating the polymer slurry of a loop reactor have been unsatisfactory. This is true, in particular, for the production of bimodal polyethylene in cascaded reactors.

Bimodal polyethylene comprises at least one low molecular weight component and at least one high molecular weight component. It can be produced in a cascade of reactors, which means that polymerisation is carried out in a plurality of reactors placed in serial arrangement so that the polymerisation product withdrawn from the product outlet of one reactor is fed into the inlet of the following reactor. When using cascaded polymerisation reactors, it is important to prevent the flow of certain reactants from one polymerisation stage to the next. If the low molecular weight polymer component is produced in the first polymerisation stage, any carryover of hydrogen from the first stage to the second stage will reduce the molecular weight produced in the second stage, thereby leading to reduced mechanical properties and inferior melt strength of the final polymer. On the other hand, if the high molecular weight component is produced in the first reactor, then carryover of comonomers into the second polymerisation stage will have a negative impact on the mechanical properties of the final polymer.

The use of hydrocyclones for concentrating the outlet slurry of a loop reactor is known since the 1960's. Loop reactors equipped with a hydrocyclone are disclosed in, e.g., U.S. Pat. No. 3,816,383, where a part of the underflow from the hydrocyclone is taken to product recovery, while the residual part is combined with the overflow and returned to the loop reactor.

Another document relating to the above-mentioned topic is U.S. Pat. No. 4,395,523, which discloses a method of making and recovering polymer particles. The known method comprises polymerising in a loop reactor, directing a portion of the recirculating polymer slurry into a hydrocyclone, returning the overflow from the hydrocyclone into the reactor and withdrawing the underflow from the hydrocyclone and conducting it to product recovery.

Further, EP 1 118 624, EP 1 118 625 and EP 1 118 626 disclose a process for polymerising olefins, where the polymer slurry is directed from a loop reactor into a hydrocyclone. The underflow from the hydrocyclone is directed either to a subsequent polymerisation stage or to product recovery.

EP 891 990 discloses an ethylene polymerisation process comprising a continuous take-off of polymer slurry. The polymer slurry is continuously withdrawn from the loop reactor and fed to a high-pressure flash. From the high-pressure flash, the polymer is transferred into a low-pressure flash and from there to product recovery.

EP 517 868 discloses a process for producing ethylene polymers in a reactor cascade comprising a loop reactor and a gas phase reactor. The document does not disclose how the polymer slurry is withdrawn from the loop reactor. Hydrocarbons are separated from the polymer, but no details are given on how this is done. Finally, the polymer is fed into the gas phase reactor.

Even if the above documents describe different methods of withdrawing the slurry from the loop reactor, none of them discloses or suggests a suitable, cost efficient process for polymerising ethylene in two successive stages, the first stage being conducted in a loop reactor and the second stage in a gas phase reactor. The polymer is separated from the reaction mixture after the loop polymerisation stage and at least a part of the hydrocarbon mixture is removed. Then essentially no hydrogen is carried over to the gas-phase polymerisation reactor.

The process of EP 517 868 comprises a low-pressure flash after the loop reactor for separating the polymer from the reaction mixture. While this provides effective separation, it is a relatively expensive process, because the overhead flow from the flash needs to be compressed before it can be returned into the loop reactor and the polymer must be fed into the gas phase reactor with e.g. a pressurising/depressurising sequence.

One way of overcoming the above-mentioned problem involving the necessity of compressing the overhead flow from the flash, would be to replace the low-pressure flash of EP 517 868 with a high-pressure flash, as suggested in EP 891 990. However, if the slurry were withdrawn from the reactor continuously, as proposed in EP 891 990, the separation of the reactants would not be sufficiently efficient and, in particular, some hydrogen would be carried over from the loop reactor to the gas phase reactor, thus limiting the molecular weight that could be produced in the gas phase reactor. The use of a combination of a high-pressure flash and a low-pressure flash would result in an expensive process. Finally, if the polymer slurry were withdrawn from the loop reactor intermittently by using settling legs and the thus withdrawn concentrated slurry would be conducted to a high-pressure flash, there would still remain the problem with high hydrogen concentration in the gas. However, the flash would now have to be designed for a high flow, because the flow rates are high at the times when the settling legs open to discharge the slurry. This overdesign and use of settling legs leads to a high investment cost.

SUMMARY OF THE INVENTION

It is an aim of the present invention to eliminate the problems of the prior art and to provide a novel way of polymerising ethylene and other olefin monomers, optionally in the presence of comonomers, in a reactor cascade comprising a loop reactor and a gas phase reactor.

It is a particular aim of the present invention to find an economical alternative to the process known from EP 517 868 by providing a novel and cost-efficient process for polymerising ethylene in two successive stages, the first stage being conducted in a loop reactor and the second stage in a gas phase reactor, where the polymer is separated from the reaction mixture after the loop polymerisation stage so that no reactant, especially no hydrogen, is transferred from the loop reactor to the gas phase reactor in such an extent that it would have an adverse effect in the polymerisation in gas phase.

The invention is based on the idea of using, in combination, means located outside the loop reactor for increasing the solids content of the slurry withdrawn from the loop reactor to provide a concentrated slurry, and a high-pressure flash unit for essentially evaporating all of the remaining liquid-phase hydrocarbons of the slurry phase diluent to provide a gas/solids mixture containing polymer solids gases. Alternatively, the slurry can be concentrated when it is withdrawn from the reactor.

Thus, the apparatus for producing an olefin polymer in the presence of a catalytic system preferably comprises, in a cascade, a loop reactor, means for increasing the concentration of polymer slurry withdrawn from the loop reactor, a high-pressure flash and a gas phase reactor. The means for increasing the concentration of the slurry can be located externally to the loop reactor or be arranged in conjunction with the reactor outlet.

The process according to the invention for producing olefin polymers in the presence of a catalytic system in a continuously operated multistage polymerisation sequence, comprises the steps of continuously withdrawing from the loop reactor a polymer slurry containing polymer and a fluid mixture containing diluent, monomers and optionally hydrogen, optionally, concentrating the slurry by removing a part of the hydrocarbon diluent to provide a concentrated slurry, conducting the concentrated slurry to a high pressure flash unit in order to remove essentially all of the remaining hydrocarbon diluent and to provide a product stream containing a mixture of polymer solids and gases, transferring the product stream from the flash into the gas phase reactor.

According to a preferred embodiment of the invention, the product stream from the flash unit can be purged countercurrently in a gas-exchange zone with essentially hydrogen-free gas in order to reduce the amount of hydrogen carryover to the gas phase reactor.

The present invention provides important advantages. Thus, it is possible to produce bimodal polyethylene with good properties. There is no harmful carryover of reactants from the first polymerisation stage to the second polymerisation stage. Expensive overdesign of process elements can be avoided. The operation of the process is stable because of the truly continuous operation. The time of transitions and start-up can be reduced.

Further details and advantages of the invention will become apparent from the following detailed description comprising a number of working examples.

DETAILED DESCRIPTION OF THE INVENTION

Overall Process

Figure 1:
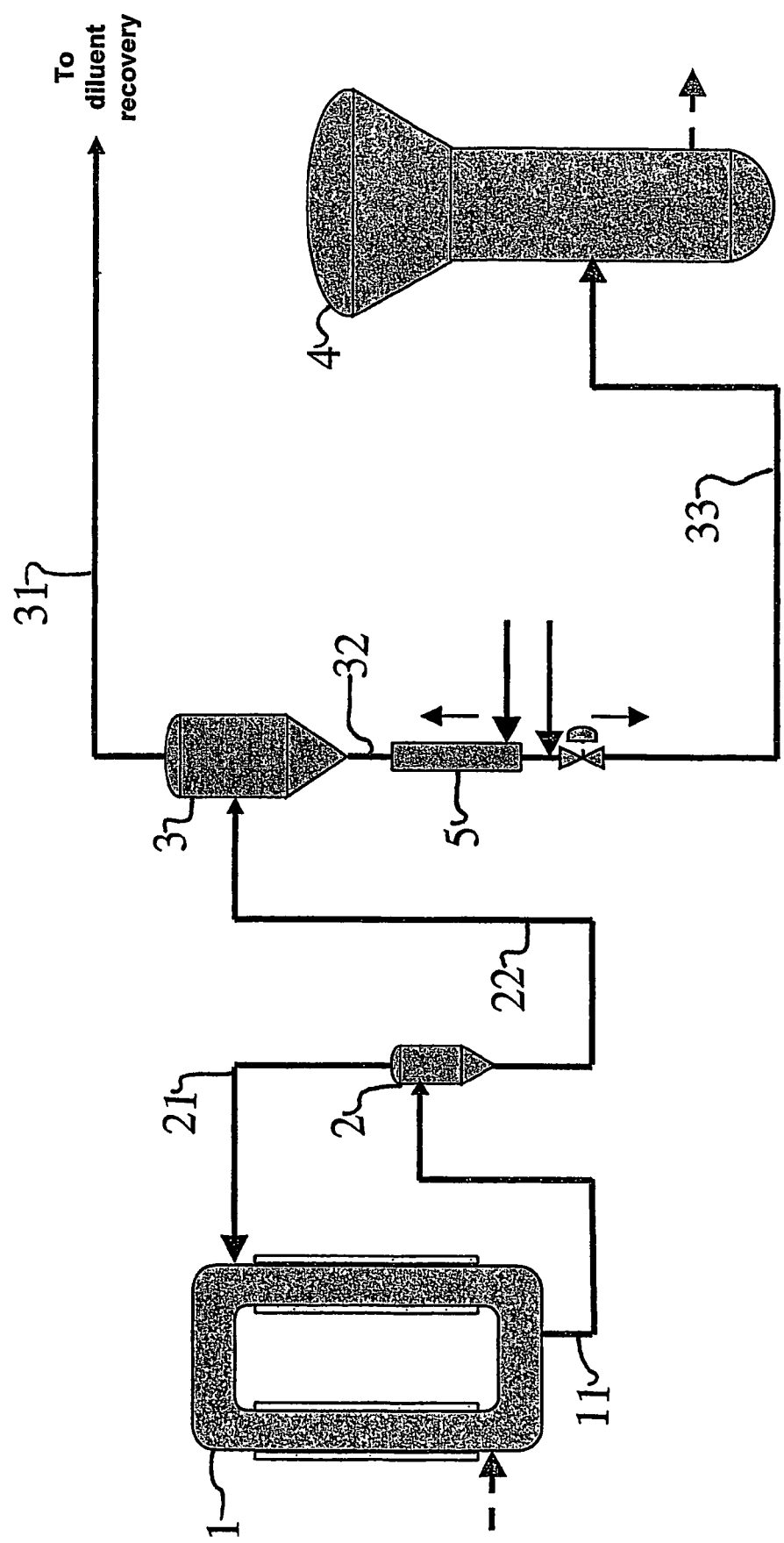
FIG. 1 depicts in a schematic fashion the process configuration of a first preferred embodiment of the invention.

The reference numerals used in the attached drawing refer to the following pieces of equipment:
1. loop reactor
2. hydrocyclone
3. high pressure flash receiving vessel
4. gas phase reactor
11. loop reactor outlet line
21. overhead flow from the hydrocyclone
22. flash pipe (heated)
31. overhead flow to the diluent recycle
32. flow from the flash receiving vessel
33. polymer flow to the gas phase reactor
5. gas exchange zone The present invention includes the following steps, which will appear from the attached drawing showing an embodiment of the invention:

Olefin monomers like ethylene and optionally one or more alpha-olefin comonomer(s) are polymerised in a loop reactor 1 in a hydrocarbon diluent, preferably propane or isobutane, in the presence of a polymerisation catalyst, optionally in the presence of hydrogen. The polymer slurry is continuously withdrawn from the loop reactor 1 through an outlet nozzle.

At least a part of the polymer slurry thus withdrawn is conducted to a hydrocyclone 2, in which the slurry is concentrated to provide a first product stream having a high concentration of solid matter and a second product stream, which mainly consists of hydrocarbon diluent separated from the polymer slurry. The first product stream forms the underflow of the hydrocyclone 2 and it is conducted via flash pipe 22 to receiving vessel of the flash unit 3, which preferably is operated at a high pressure. The overhead flow comprising the second product stream of the hydrocyclone is recycled from the hydrocyclone 2 to the loop reactor 1.

The bottom flow containing the polymer is conducted from the receiving vessel of the flash unit 3 into a gas phase reactor 4, preferably by gravity drop or pressure difference.

At least a part of the overhead flow from the receiving vessel of the flash unit, consisting mainly of hydrocarbons is recycled directly or indirectly into the loop reactor 1 or gas phase reactor 4.

Optionally, the flow containing the polymer can be passed through a gas exchange zone before it is introduced into the gas phase reactor 4.

The various steps of the process will now be described in more detail.

A. Loop Reactor

In the loop reactor 1, olefins like ethylene are homopolymerised or copolymerised with at least one $C_4$ to $C_{10}$ alpha-olefin. The polymerisation takes place in an inert hydrocarbon diluent or liquid monomer, preferably a $C_3$ to $C_5$ hydrocarbon diluent, more preferably in propane or isobutane diluent, and in particular propane diluent.

The temperature in the loop is from about 60° C. to about 110° C., preferably from 75 to 105° C. If ethylene or propylene is homopolymerised in the loop reactor, it is preferred to operate the loop reactor at conditions known as "supercritical", where the operating temperature exceeds the critical temperature of the reaction mixture and the operating pressure exceeds the critical pressure of the reaction mixture. At such conditions, the operation temperature is higher than 90° C., preferably higher than 93° C.

The operating pressure needs to be selected so that the contents of the loop reactor remain either in liquid state or supercritical state. For liquid slurry operation, the suitable range of operating pressure is from about 20 to about 100 bar, preferably from 25 to 75 bar. For supercritical slurry operation, the suitable range of operating pressure is from about 50 to about 100 bar, preferably from 55 to 80 bar.

Suitable catalysts that can be used to polymerise ethylene are, e.g., Ziegler-Natta catalysts, single-site catalysts, multisite catalysts containing one or more single-site catalyst components, or combinations or mixtures of these.

The Ziegler-Natta catalyst comprises titanium and magnesium compounds, optionally also aluminium compounds, and may be supported on an inert support, such as silica or magnesium dichloride. Preferable catalysts are those that are disclosed in EP 688 794, EP 949 274, WO 99/58584 and WO 01/55230.

The single-site catalyst may be any catalyst that comprises one or more substituted or unsubstituted cyclopentadienyl ligands. Particularly useful are catalysts disclosed in WO 97/28170 and WO 00/34341.

Preferably, ethylene is (co)polymerised in the loop reactor in the presence of hydrogen to produce the low molecular weight polymer component. Typically, the reaction mixture contains from 0 to 10%, preferably from 0 to 4 mol-% of alpha-olefin comonomer. If a Ziegler-Natta catalyst is used, the reaction mixture typically contains from 2 to 10 mol-% hydrogen, preferably from 2 to 8 mol-%. If a single site catalyst is used, the reaction mixture typically contains from 0.01 to 1 mol-% hydrogen. Further, the reaction mixture contains typically from 1 to 10 mol-%, preferably from 3 to 10 mol-% ethylene. If a single site catalyst is used, then slightly lower ethylene concentration may be used. The reaction mixture further comprises the components of the diluent. Preferably, the major part of the diluent is propane, with minor quantities of other alkanes, such as methane, ethane, and butanes.

The concentration of the polymer in the reactor slurry is typically from 10 to 40% by volume, preferably from 20 to 30% by volume.

The polymer slurry is withdrawn from the loop reactor continuously through an outlet. The outlet may be placed at any suitable location in the reactor. However, most preferably the outlet is located at a suitable location downstream of the loop circulation pump. It is also possible to withdraw the slurry from the loop reactor in such a manner that the concentration of solids at the outlet is higher than the concentration of solids in the loop reactor. The slurry may be directed into the flash unit directly or through a further concentration step.

Pressure of the reactor is controlled by continuous withdrawal of the slurry from the reactor through an outlet nozzle. The said slurry can be directed to the hydrocyclone. In that case the pressure control valve is located in the product take off line of the hydrocyclone.

Performance of the hydrocyclone is highly dependent on the feed conditions. Any disturbance in the bottom flow will affect the performance of the hydrocyclone. The design can be made e.g. by allowing a wide controlling range for the feed flow. Stable operating conditions could then be reached by recycling a part of the slurry from the bottom of the hydrocyclone to the reactor.

Cut size of the particles can be adjusted e.g. by controlling the feed flow to the hydrocyclone. Solids concentration at the bottom of the hydrocyclone can be measured and adjusted by adjusting the ratio of the recycle flow (overflow) and the product flow (underflow).

B. Hydrocyclone

From the loop reactor 1 the polymer slurry is directed to a hydrocyclone 2, where the concentration of the slurry takes place by effect of centrifugal forces. The hydrocyclone divides the slurry flow into two streams: An overflow 21, which is rich in liquid, and an underflow, which is rich in polymer. The overflow is returned to the loop reactor or to a fines collection tank (not shown in the drawing) and the underflow is directed to a flash unit.

As described above, the slurry entering the hydrocyclone has a solids content of 10 to 40% by volume. The solids concentration in the underflow can be adjusted by adjusting the ratio of the recycle flow (overflow) to the product flow (underflow), and is typically from 30 to 55% by volume, preferably 40 to 52% by volume. It is often advantageous to recycle a part of the underflow back to the loop reactor.

The maximum solids concentration in the product flow is set by the limit of stable operation. If the solids concentration of the slurry is too high, the risk of plugging the product flow increases. For economical reasons, on the other hand, as high as possible solids concentration in the slurry is desired.

Typically, the ratio of recycle flow to product flow is from about 0.01 to about 10, preferably from 0.01 to 5 and more preferably from 0.1 to 2.

The solids concentration of the recycle flow is typically about 0 (or at least 0.001) to 5% by volume.

C. High Pressure Flash Unit

The flash unit 3 typically consists of a heated flash pipe 22 and a receiving vessel 3. The slurry entering the flash unit has a solids concentration of 30 to 60% by volume. In the flash unit, the remaining hydrocarbons are removed from the polymer. The flash pipe is preferably heated, e.g. by steam or water. If water is used for heating, the heating water can be advantageously taken from the jacket of the loop reactor. The temperature is selected according to the composition of the hydrocarbon fluid so that the fluid is essentially evaporated. The phrase "essentially removing the fluid phase" means that a major fraction of the fluid phase is removed and only an amount of fluid that fills the volume between the polymer particles and the volume of pores in the polymer particles remains with the polymer. Typically, the temperature at the receiving vessel is from 50 to 100° C., preferably from 60 to 90° C., in particular from 70 to 90° C., and a pressure of 10 to 30 bar, preferably 12 to 27 bar, and in particular from 14 to 24 bar. The pressure is preferably higher than the pressure in the gas phase reactor, to allow smooth transfer of the polymer into the gas phase reactor. Advantageously, the pressure is at least 0.05 bar higher than in the gas phase reactor.

At least a part of the overhead flow 31 from the receiving vessel of the flash unit 3 is passed to the recovery system for recycling into the loop reactor 1 or gas phase reactor 4 or both. A small purge stream can be recycled e.g. to a cracker.

D. Gas Exchange Zone

The product flow 32 from the flash receiving vessel 3 is directed into a gas phase reactor. The flow contains about the void volume of gas of the same composition as the loop reactor fluid the rest being polymer. Before introduction into the gas phase reactor, the product flow can be passed through a gas exchange zone 5, where it is flushed countercurrently with essentially hydrogen free gas fraction from the diluent recovery or with a pure hydrocarbon, preferably propane, to reduce the amount of hydrogen carryover to the gas phase reactor. The gas displacement zone comprises a conduit and a control valve or optionally one or two rotary feeders.

There are different ways of implementing the gas exchange zone. One possibility is simply to have a control valve in the conduit used for transporting the polymer from the flash into the gas phase reactor. The flush gas is then introduced into the conduit upstream the control valve and optionally also below the control valve.

Another alternative is to have one or two rotary feeders after the flash unit. The rotary feeder moves a part of the gas upwards and a part of the gas downwards. Again, flush gas is introduced into the conduit between the rotary feeder(s) and the gas phase reactor below and optionally also above the rotary feeder(s).

The product flow after flushing contains typically less than 0.1 mol-% of hydrogen.

The product flow is transferred to the gas phase reactor. An auxiliary gas may be used to facilitate smooth transfer of the product flow into the gas phase reactor.

E. Gas Phase Reactor

The gas phase reactor 4 is operated at a temperature of from about 60° C. to about 115° C., preferably 70 to 110° C. The operating pressure is from 10 to 30 bar, preferably from 15 to 25 bar.

In the gas phase reactor, olefins are is copolymerised with one or more $C_2$ to $C_{10}$ alpha-olefin comonomers, or the olefins like ethylene are homopolymerised.

Preferably, the olefins like ethylene are copolymerised in the gas phase reactor with a minor amount of hydrogen to produce a high molecular weight polyethylene copolymer. The reaction mixture contains typically from 5 to 25 mol-% ethylene, from 0.1 to 10 mol-% alpha-olefin comonomer and from 0.01 to 3 mol-% hydrogen. If a single site catalyst is used to polymerise ethylene, then the content of hydrogen may be from 0.001 to 1 mol-%. The remainder is composed of inert components, like nitrogen or propane.

Summarising what has been stated above, one particularly preferred embodiment of the invention comprises the following steps: Polymerising the monomer in the presence of a catalytic system in a loop reactor 1 using a suitable catalyst and an inert hydrocarbon diluent, continuously withdrawing the polymer slurry from the loop reactor through an outlet line 11, concentrating the slurry in a hydrocyclone 2 to remove excess hydrocarbons to provide a concentrated slurry, returning the overflow 21 containing hydrocarbons from the hydrocyclone to the loop reactor, directing the concentrated slurry through a heated flash pipe 22 to the receiving vessel 3 of the high pressure flash unit in order to remove excess fluid reaction mixture, directing the product flow 32 from the receiving vessel of the flash unit into a gas phase reactor.

According to a second particularly preferred embodiment, the product flow 32 from the receiving vessel of the flash unit is directed into a gas phase reactor through a gas exchange zone. In the gas exchange zone, the amount of hydrogen in the product flow is reduced by flushing the flow with an essentially hydrogen free gas.

EXAMPLES

Example 1

A 20 m³ loop reactor is operated at 95° C. and 60 bar pressure with propane diluent. Ethylene homopolymer is produced in the reactor by introducing ethylene, diluent, hydrogen and a polymerisation catalyst, which was prepared according to Example 3 of EP 688 794 with the exception that as a carrier material silica having an average particle size of 20 μm is used, in such quantities that the diluent contains 5.9 mol-% of ethylene and 2.6 mol-% hydrogen. The remainder is propane with minor quantities (less than 1 mol-% each) of methane, ethane, isobutane and n-butane. The polymer production is 2.8 tons per hour; the melt index of the polymer is 450 g/10 min and the density 973 kg/m³. The solids content of the slurry is 25 vol-%.

The polymer slurry is withdrawn continuously from the reactor through an outlet nozzle and transferred to a hydrocyclone according to FIG. 1. The total slurry feed to the hydrocyclone is 5.5 tons per hour. The product flow is 3.7 tons per hour, with 52 vol-% of solids. The recycle flow is 1.8 tons per hour, with 1.7 vol-% solids. The recycle flow is returned to the loop reactor.

The product flow of the hydrocyclone is routed into a flash pipe and further to a flash receiving vessel, operated at a temperature of 75° C. and a pressure of 21 bar. The hydrocarbons separated from the polymer are returned into the loop reactor via a diluent recovery. They contain 5.9 mol-% of ethylene and 2.6 mol-% of hydrogen.

The product flow from the flash receiving vessel is introduced into a gas exchange zone, where it is flushed with 300 kg/h of propane. The gas entering the gas displacement zone with powder contains 5.9 mol-% of ethylene and 2.6 mol-% of hydrogen. After flushing, the gas flow to the gas phase reactor with powder contains 0.3 mol-% of ethylene and 0.1 mol-% of hydrogen the rest being propane. The flush gas is recycled to diluent recovery via a flash receiving vessel.

The product flow from the gas exchange zone containing part of the flush propane is introduced into a gas phase reactor essentially by gravity drop, where the polymerisation is continued by adding ethylene, hydrogen and 1-butene so that the reaction mixture contains 13 mol-% ethylene, 0.9 mol-% 1-butene and 0.35 mol-% hydrogen, the remainder being nitrogen and a minor amount of propane. The polymerisation temperature is 80° C. and pressure is 20 bar. The polymer production rate in the gas phase reactor is 3.2 tons per hour, so that 6 tons of polymer is withdrawn from the gas phase reactor per hour. The final polymer has a melt index $MFR_{21}$ of 9 g/10 min and density of 949 kg/m³.

Example 2

Into the reactor of Example 1 is introduced ethylene, 1-butene, hydrogen and diluent, as well as similar catalyst to what was used in Example 1, so that the reaction mixture contains 5.9 mol-% ethylene, 3.7 mol-% 1-butene and 2.6 mol-% hydrogen. Polymerisation temperature is 85° C. The polymer production is 2.4 tons per hour, the melt index of the polymer is 200 g/110 min and the density 952 kg/m³. The solids content of the slurry is 25 vol-%.

The polymer slurry is withdrawn continuously from the reactor through an outlet nozzle and transferred to a hydrocyclone according to FIG. 1. The total slurry feed to the hydrocyclone is 5.2 tons per hour. The product flow is 3.8 tons per hour, with 39 vol-% of solids. The recycle flow is 1.4 tons per hour, with 5.8 vol-% solids. The recycle flow is returned to the loop reactor.

The product flow of the hydrocyclone is introduced into a flash pipe and further to a flash receiving vessel, operated at a temperature of 80° C. and a pressure of 20 bar. The hydrocarbons separated from the polymer are returned into the loop reactor. They contain 5.9 mol-% of ethylene, 3.7 mol-% 1-butene and 2.6 mol-% of hydrogen.

The product flow from the flash receiving vessel is introduced into a gas exchange zone consisting of a conduit and a rotary feeder, where it is flushed with 300 kg/h of essentially hydrogen free flow from diluent recovery. The gas entering the gas displacement zone with powder contains 5.9 mol-% of ethylene, 3.7 mol-% of 1-butene and 2.6 mol-% of hydrogen. After flushing, the gas flow to the gas phase reactor with powder contains 0.3 mol-% of ethylene, 0.3 mol-% of 1-butene and 0.05 mol-% of hydrogen the rest being propane. The flush gas is recycled to diluent recovery via a flash receiving vessel.

The product flow from the receiving vessel of the flash unit is introduced into a gas phase reactor where the polymerisation is continued by adding ethylene, hydrogen and 1-butene so that the reaction mixture contains 12 mol-% ethylene, 5.3 mol-% 1-butene and 0.08 mol-% hydrogen, the remainder being nitrogen and a minor amount of propane. The polymerisation temperature is 80° C. and pressure is 19 bar. The polymer production rate in the gas phase reactor is 3.6 tons per hour, so that 6 tons of polymer is withdrawn from the gas phase reactor per hour. The final polymer has a melt index $MFR_{21}$ of 18 g/10 min and density of 922 kg/m$^3$.

The invention claimed is:

1. A process for producing olefin polymers in the presence of a catalytic system in a continuously operated multistage polymerisation sequence, wherein an olefin monomer is polymerised first in slurry phase in a hydrocarbon diluent or liquid monomer, in at least one loop reactor, the slurry having a first concentration of solids, and then subsequently in gas phase in at least one gas phase reactor, said process comprising continuously withdrawing from the loop reactor a polymer slurry containing polymer and a fluid phase, further containing hydrocarbons and optionally hydrogen, concentrating the slurry by removing a part of the fluid phase to provide a concentrated slurry, conducting the concentrated slurry having a second concentration of solids, which is higher than the first concentration of solids, to a high pressure flash unit in order to remove essentially all of the remaining fluid phase and to provide a product flow containing a suspension of polymer solids and gases, and feeding the product flow of the flash unit into the gas phase reactor, wherein a receiving vessel of the flash unit is operated at a pressure of 10 to 30 bar, the operating pressure of the flash unit being higher than the pressure in the gas phase reactor.

2. The process according to claim 1, wherein the solids content of the concentrated slurry is 30 to 55% by volume.

3. The process according to claim 1 or 2, wherein the slurry is concentrated by using a hydrocyclone or a sieve.

4. The process to claim 3, wherein the slurry is concentrated in a hydrocyclone to provide an underflow, which comprises the concentrated slurry, and an overflow, which is rich in hydrocarbon(s).

5. The process according to claim 1, wherein the slurry is withdrawn from the loop reactor in such a manner that the concentration of solids at the outlet is higher than the concentration of solids in the loop reactor.

6. The process according to claim 4, wherein the overflow is recycled to the loop reactor.

7. The process according to claim 6, wherein the ratio of the recycled overflow to the underflow withdrawn from the hydrocyclone is 0.01 to 10.

8. The process according to any of claims 4, 6 and 7, wherein the solids concentration of the slurry of the overflow is 0.001 to 5% by volume of the flow.

9. The process according to claim 1, wherein the flash unit comprises a flash pipe, which is optionally heated, in which the remaining hydrocarbons of the concentrated slurry are at least partly evaporated to form an overflow containing the evaporated fluid phase, and a receiving vessel to form an overflow containing the evaporated fluid phase and a product flow containing the polymer particles and a minor amount of the fluid phase.

10. The process according to claim 1, wherein the receiving vessel of the flash unit is operated at a pressure of 12 to 27 bar.

11. The process according to claim 9, wherein the receiving vessel of the flash unit is operated at a pressure, which is at least 0.05 bar higher, than the pressure in the gas phase reactor.

12. The process according to claim 9, wherein the flash pipe is heated with steam or water so that temperature of the gas at the receiving vessel is 50 to 100° C.

13. The process according to claim 12, wherein the flash pipe is heated with water taken from a jacket of the loop reactor.

14. The process according to any of claims 11 to 13, wherein the overflow from the flash is recycled into the loop reactor or conducted to the gas phase reactor or both.

15. The process according to claim 2, wherein the solids content of the concentrated slurry is 40 to 52% by volume.

16. The process according to claim 7, wherein said ratio is 0.01 to 5.

17. The process according to claim 7, wherein the ratio is 0.1 to 2.

18. The process according to claim 10, wherein said pressure is 14 to 24 bar.

19. The process according to claim 12, wherein said temperature is 60 to 90° C.

20. The process according to claim 12, wherein said temperature is 70 to 90° C.

* * * * *